US006650405B2

United States Patent
Lam et al.

(10) Patent No.: US 6,650,405 B2
(45) Date of Patent: Nov. 18, 2003

(54) METHOD FOR DETECTING STRESS AND STRAIN

(76) Inventors: Duhane Lam, 1572 East 10$^{th}$ Avenue, Vancouver, BC (CA), V5N 1X5; Mark William Ellens, 2685 Wall Street, Vancouver, BC (CA), V5K 1A7

( * ) Notice: Subject to any disclaimer, the term of this patent is extended or adjusted under 35 U.S.C. 154(b) by 24 days.

(21) Appl. No.: 09/861,510

(22) Filed: May 21, 2001

(65) Prior Publication Data

US 2002/0001073 A1 Jan. 3, 2002

Related U.S. Application Data (60) Provisional application No. 60/208,048, filed on May 31, 2000.

(51) Int. Cl.$^7$ ................................................ G01B 11/16
(52) U.S. Cl. ............................ 356/33; 356/32; 356/73; 73/800
(58) Field of Search ............................. 356/32, 73, 33; 73/800

(56) References Cited

U.S. PATENT DOCUMENTS

| | | |
|---|---|---|
| 3,847,481 A | 11/1974 | Paraskevas et al. |
| 3,971,934 A | 7/1976 | Coatta et al. |
| 3,994,598 A | 11/1976 | Reytblatt |
| 4,008,960 A | 2/1977 | Reytblatt |
| 4,075,011 A * | 2/1978 | Iwasa et al. ............. 430/120 |
| 4,353,649 A | 10/1982 | Kishii |
| 4,668,085 A | 5/1987 | Pitt et al. |
| 4,875,170 A * | 10/1989 | Sakurai et al. ............ 702/34 |
| 4,892,901 A * | 1/1990 | Liu .......................... 524/303 |
| 5,242,722 A | 9/1993 | Hiraka et al. |
| 5,270,781 A * | 12/1993 | Singh et al. ................ 356/32 |
| 5,298,964 A | 3/1994 | Nelson et al. |
| 5,400,131 A | 3/1995 | Stockley et al. |
| 5,438,879 A | 8/1995 | Reda |
| 5,546,811 A * | 8/1996 | Rogers et al. ............. 73/800 |
| 5,699,159 A * | 12/1997 | Mason ...................... 356/351 |
| 5,723,794 A | 3/1998 | Discenzo |
| 5,991,042 A * | 11/1999 | Rupieper et al. ......... 356/630 |
| 6,008,888 A * | 12/1999 | Nottke et al. ............. 356/71 |
| 6,055,053 A * | 4/2000 | Lesniak .................... 356/366 |
| 6,069,703 A * | 5/2000 | Banet et al. .............. 356/432 |
| 6,072,568 A * | 6/2000 | Paton et al. ............... 356/32 |
| 6,271,921 B1 * | 8/2001 | Maris et al. .............. 356/432 |
| 6,327,030 B1 * | 12/2001 | Ifju et al. .................. 356/32 |

FOREIGN PATENT DOCUMENTS

GB 2111227 11/1982

OTHER PUBLICATIONS

Measurements Group, "Introduction to Stress Analysis by the Photostress Method", 1989, Tech Note TN–702–1, USA.

\* cited by examiner

*Primary Examiner*—Karl D. Frech
*Assistant Examiner*—Ahshik Kim (57) ABSTRACT

A method of detecting stress and strain using a powder coat finish and photoelastic techniques. A part is provided with a photoelastic layer comprising a non-opaque powder coat finish that becomes optically anisotropic when stressed. Photoelastic techniques are used to detect and measure stress and strain in the part. Fringe patterns appear in the photoelastic layer indicating the locations and magnitudes of the stress and strain when the part is illuminated with polarized light and viewed through a polarizing filter. Stress and strain resulting from applied forces are detected. Structural deformation in parts that have experienced plastic deformation is also detected. Photoelastic techniques using powder coat as a photoelastic technique are less expensive and easier to apply than traditional photoelastic coatings. Applications include testing of prototypes, stress testing, inspection and monitoring of production parts, and anywhere that viewing and measuring of stress and strain are of interest.

30 Claims, 5 Drawing Sheets

METHOD FOR DETECTING STRESS AND STRAIN

CROSS-REFERENCE TO RELATED APPLICATIONS

This application is entitled to the benefit of the filing date of U.S. Provisional Patent Application Ser. No. 60/208,048, filed May 31$^{st}$, 2000.

FIELD OF THE INVENTION

This invention relates to the field of stress and strain measurement, specifically to an improved method for detecting and viewing of stress and strain in objects or parts.

BACKGROUND OF THE INVENTION

Stress and Strain Detection and Measurement

Stress and strain detection and measurement is an important field of engineering and is used in almost every area of manufacture and construction where a knowledge of the stresses and strains being experienced by an object are important. By knowing the stresses in a part, failure modes and service life can be predicted and failure analysis can be performed. With this knowledge, parts can be redesigned to be lighter, stronger, or less expensive. "Stress" and "strain" are sometimes used interchangeably in the following descriptions, since one can be determined if the other is known and a stress-strain diagram is available.

Strain, e, is a dimensionless response to stress expressed as a fraction $e=\Delta L/L_o$ where $L_o$ is the original length of the object and $\Delta L$ is the change in length of the object when stress is applied. Stress, s, is a measure of force per unit area given by F/A where F is the force being applied and A is the area it is being applied to. Because stress cannot be measured directly in practice, strain is measured instead. The stress in an object is related to the strain by the Young's Modulus, E, which is given by the following relationship:

$$E = \frac{s}{e_{el}} = \frac{(F/A)}{(\Delta L/L_o)} = \text{stress}/\text{strain}.$$

Knowing the Elastic Modulus of a given material, the stress in the material can be determined by measuring the strain. Traditionally, stress and strain measurements have been accomplished by a number of different methods. Some of these methods are described below:

Strain Gages

Strain gages are small electronic devices that measure strain through a change in resistance. The resistance, R, of a wire is a function of the size of the wire as well as of the material as follows:

$$R = \rho\left(\frac{L}{A}\right),$$

where L is the length of the wire, A is the cross-sectional area of the wire, and ρ is electrical resistivity, a property of the material. As the length of the wire L increases and the cross-sectional area A decreases, the resistance R increases. This property can be exploited to measure strain with a strain gage. By measuring the increase in resistance of a length of a thin wire attached to a part, the strain in the part can be determined and the stress calculated.

Unfortunately, strain gages have a number of disadvantages. First, applying a strain gage to a part can be difficult. Second, the electrical signal produced by a strain gage is very small and must be amplified. Amplification can lead to noise problems and loss of accuracy. Another significant disadvantage of strain gages is they can only measure strain in one direction. A different strain gage must be used for every different direction in which strain is to be measured. Finally, strain gages can only measure localized strain. That is, the strain gage can only measure strain exactly at the point where the gauge is applied. As such, strain gages require prior knowledge of the stress and strain distribution in the part and the direction of strains in order to be most effective.

Brittle Lacquer

Brittle lacquer is a brittle coating that cracks easily under tensile strain. The lacquer is applied to the unstressed part. When the part is stressed, the brittle lacquer cracks, starting at the areas of highest strain. Brittle lacquer is difficult to work with and does not provide a quantitative measure of the stress and strain. As such, the brittle lacquer method can only indicate which areas of a part are experiencing stress and strain. Also, only one test is possible with a given application of brittle lacquer. Once the brittle lacquer has cracked, the coating must be stripped off and reapplied for subsequent tests.

Fiber Optics

Fiber-optics can be used to measure stress and strain by detecting the change in length of all optical fiber. In theory, the operation of a fiber-optic strain gage is similar to the operation of a strain gage that measures change in resistance. In the case of a fiber-optic strain gage, a change in the transmissibility of light is being measured. Fiber-optic strain gages possess the same disadvantages as standard strain gages: they are difficult to apply and can only measure localized strain in one direction. As such, prior knowledge of the stress and strain field in the part is required.

Because of the disadvantages and the complexity of strain gages, brittle lacquer, and fiber-optics, these techniques for measuring stress and strain are typically used only at the product development stage. Manufactured products generally do not come with built-in strain gages for monitoring stresses and strains, although this might be desirable in some cases. For instance, monitoring the stresses and strains in a production aircraft part would be useful to help predict failures of that part and to schedule maintenance on that part. Moreover, the cost of these particular methods of detecting stress and strain make them somewhat prohibitive even at the product development stage.

Photoelastic Techniques

A different class of stress and strain measurement techniques which have been used for a number of years are known as photoelastic techniques. Photoelastic techniques exploit the photoelastic properties of certain materials to detect stress and strain. The speed of propagation of light in transparent materials is generally slower than in a vacuum or in air. The ratio of the speed of light in a given material to the speed of light in a vacuum is called the index of refraction of that material. In homogeneous materials, the index of refraction is constant regardless of the direction of propagation or plane of vibration of the light. In other materials, strain in the material causes the index of refraction to change depending on the direction of propagation of light.

These materials, which can be optically isotropic when unstrained, become optically anisotropic when strain is present.

Materials which become optically anisotropic when stressed are known as photoelastic materials. The change in index of refraction relative to index axis in the material can typically be related to the stress and strain in the material by observing and quantifying the photoelastic effect. The photoelastic effect is caused by alternately constructive and destructive interference between light rays which have undergone relative retardation, or phase shift, in the stressed photoelastic material. When illuminated with polarized light and viewed through a polarizing filter, fringe patterns become visible in the photoelastic material that reveal the overall stress and strain distribution in the part and show the locations and magnitudes of the stresses and strains in the part. A person skilled in the art of photoelastic analysis can interpret and measure these patterns.

Photoelastic techniques have the advantage of being a full-field measurement technique. The strain over the entire surface of the part can be measured. Furthermore, the measurement technique is not directional. Unlike strain gages, a photoelastic coating can detect strain regardless of the direction of that strain. As such, prior knowledge of the directions and magnitude of the strain in the part before applying the photoelastic coating is not required.

Photoelastic techniques are an excellent technique for stress and strain analysis with many advantages over other methods of analysis. However, the application of photoelastic coatings to parts is problematic. Presently, photoelastic materials are available in sheets and plate form for application to flat parts. To perform the analysis, a sheet of photoelastic material must be carefully cut to shape and bonded to the part. The part is then subjected to test forces. While being subjected to the test forces, the part can be viewed through a reflection polariscope to determine the direction and magnitude of the stresses and strains. For photoelastic analysis on more complex parts, a viscous liquid is used which is cast on a flat-plate mold. While still in pliable state, the sheet is removed from the mold and must be formed to the part by hand. Finally, the sheet must be bonded to the part with a reflective cement.

Photoelastic analysis using existing photoelastic coatings and methods of application have numerous disadvantages. These disadvantages include the following:

1. Photoelastic coatings are custom materials that much be specially purchased. Photoelastic coatings have limited availability and are costly because photoelastic analysis is such a specialized field.
2. The process of applying photoelastic coatings is labor intensive and imprecise. The process often involves cutting and fitting the photoelastic coating to the part by hand.
3. Photoelastic material in the form of flat sheet and plate can only be used on two-dimensional parts or very simple three-dimensional parts.
4. Molding photoelastic material to three-dimensional parts using viscous liquids is a very labor-intensive process.
5. Achieving a perfect fit between the photoelastic coating and a part with even a slight amount of complexity is virtually impossible.
6. Once the photoelastic coating has been shaped, it must be bonded to the part in a separate operation with a special reflective cement.
7. Existing methods of applying photoelastic coatings are not easily automated.
8. Traditional photoelastic coatings are only used on test parts and are not suitable for use on production parts and mass-manufactured parts.
9. Traditional photoelastic coatings do not provide protection for the part nor aesthetic enhancement of the part.

Although photoelastic techniques offer numerous advantages over other techniques for detecting stress and strain, they are limited by the difficulty and cost of applying photoelastic coatings, particularly on more complex three-dimensional parts. Because of the labor-intensive nature of applying photoelastic coatings, present photoelastic techniques have limited applicability, especially to mass-manufactured parts. There is a need for a new method of detecting and providing stress and strain information easily and cost-effectively, especially on three-dimensional parts and on mass-manufactured parts.

Powder Coating

In a field seemingly unrelated to stress and strain detection and measurement, powder coating is an advanced finishing process widely used in different industries. Powder coating is typically defined as any coating applied as a dry (without solvent or other carrier), finely divided solid which adheres to the substrate as a continuous film when cured by heating or fusing.

Powder coating typically involves applying plastic in powder form to a part and then curing the powder in an oven so it fuses together and adheres to the surface of the part. Most powder coats are electrostatically applied although different methods of applying the powder are also possible. Different types of plastics typically used for powder coating include polyesters, epoxies, acrylics, urethanes, and various hybrid blends. Some powder coats include chemicals such as TGIC (Triglycidyl Isocyanurate) to increase the durability of the coating.

A powder coat finish can be applied to a variety of different materials. While originally developed for metals, some recent advances in powder coating technology allow for the application of a powder coat finish to some ceramics, woods, and plastics. Powder coating is a widely used protective coating often applied at the time of manufacture directly to a variety of products and parts for protection and aesthetic enhancement.

Powder coating can provide a durable and attractive finish. Powder coating has numerous advantages. Powder coating is an economical, long-lasting, and color-durable finish. Powder coated surfaces are typically more resistant to chipping, scratching, fading, and wearing than many other finishes. A wide range of colors are available in high and low gloss, metallic, and clear finishes. Texture selections range from smooth to rough finishes designed for hiding surface imperfections. Powder coating is lightweight and non-toxic. In addition, the powder coating process results in less waste than commonly found in liquid finishing processes.

A wide range of products and parts covering a broad spectrum of industries are currently powder coated. These products include appliances, automotive applications, window frames, light poles, bicycles, tractors, shelves, cabinets, baby strollers, just to name a few. To date, powder coat has typically been used for providing a protective and aesthetic finish.

BRIEF SUMMARY OF THE INVENTION

In accordance with the present invention, a new method of detecting and measuring stress and strain is described comprising the use of a powder coat finish and photoelastic techniques. A test part is provided with a non-opaque layer of powder coat which becomes optically anisotropic when subjected to stress and strain. Stress and strain in the part will cause fringe patterns in the powder coat finish that can be viewed and measured in the non-opaque layer of powder coat using photoelastic techniques. Stresses and strains in the part can be detected and measured when the part is subjected to various forces. Alternatively, permanent structural deformation can be detected and measured after the part has experienced plastic deformation.

BRIEF DESCRIPTION OF THE DRAWINGS

Having thus generally described the nature of the invention, reference will now be made to the accompanying drawings, showing by way of illustration a preferred embodiment thereof, and in which.

LIST OF REFERENCE NUMERALS 20. laminate structure
22. part
24. reflective layer
26. photoelastic layer
28. control module
30. powder feeder
32. powder pump
34. spray gun
36. charged powder
38. grounding wire
40. excess powder
42. powder recovery system
44. observer
46. light source
48. polarizing filter
50. quarter-wave plate
52. source of polarized light
54. applying reflective coating
56. applying photoelastic coating
58. applying a load to part
60. illuminating with a source of polarized light
62. viewing reflected light through polarizer

DETAILED DESCRIPTION OF THE INVENTION

Figure 1:
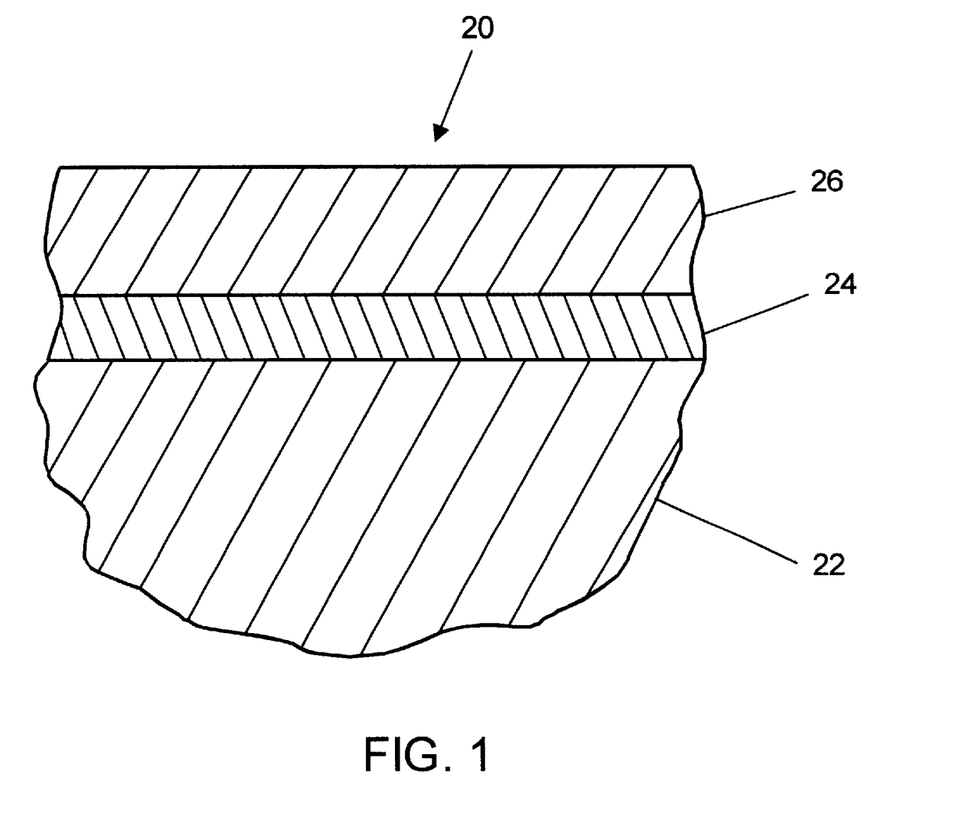
FIG. 1 is a side view of a laminate structure comprising a part, a reflective layer, and a photoelastic layer comprising non-opaque powder coat according to the present invention.

According to the present invention, photoelastic techniques can be used to detect stress and strain in parts which are coated with a non-opaque layer of powder coat that becomes optically anisotropic when subjected to stress and strain. FIG. 1 shows a laminate structure 20 comprising an object or part 22 coated with a reflective layer 24 and a photoelastic layer 26. Although the part 22 for which stress and strain information is desired may be made out of any type of material that lends itself to the powder coating process, the embodiment tested and discussed below involves a part 22 manufactured from aluminum alloy. A reflective layer 24 is first applied to the part 22. A photoelastic layer 26 comprising non-opaque powder coat is then applied on top of the reflective layer 24. Stresses and strains in the part 22 result in fringe patterns in the photoelastic layer 26 that can be observed using photoelastic techniques.

The reflective layer 24 can be achieved in a variety of ways. For example, the reflective layer 24 may be plated or applied to the part 22 with traditional liquid paint methods. In the embodiment of the invention that was tested, the reflective layer 24 was also applied with powder coating. The powder employed for the reflective layer 24 was "near-chrome" (part number U0109M) from Prismatic Powders, a division of NIC Industries of White City, Oreg. The thickness of the near-chrome powder coating was approximately 50 $\mu$m (0.002") thick. The thickness of the reflective layer 24 is in general not crucial although a thinner layer is generally preferable for the purposes of photoelastic analysis. Other powder coats such as "sparkle silver" (part number UM 112 S11) from Protech Chemicals of Saint-Laurent, Québec, Canada may also be used for the reflective layer 24.

Photoelastic layer 26 is typically applied on top of the reflective layer 24. A translucent polyester/TGIC powder coat manufactured by Tiger Drylac USA Inc. of Ontario, Calif. (part number 49/21500 "yellow") was used in the embodiment tested. The photoelastic layer 26 was applied in a thickness of approximately 50 $\mu$m (0.002"). In general, a thicker photoelastic layer 26 provides a greater photoelastic response (more fringe patterns), while a thinner photoelastic layer 26 results in a smaller photoelastic response (fewer fringe patterns) for the same amount of strain. A photoelastic layer 26 with a thickness of 50 $\mu$m (0.002") provided sufficient response to detect high levels of elastic deformation of the aluminum part. A 50 $\mu$m photoelastic layer using the translucent polyester/TGIC powder worked well for clearly identifying areas of plastic deformation in an aluminum part 22 where the stress had exceeded the yield strength of the aluminum. The preferable thickness typically depends on the amount of strain to be detected. For smaller amounts of strain, a thicker coating with a higher photoelastic sensitivity will be required. For larger amounts of strain, a thinner coating is sufficient. The photoelastic layer should preferably be in the range of 5 $\mu$m to 3000 $\mu$m. Photoelastic layers less than 5 $\mu$m thick will provide limited photoelastic response and photoelastic layers greater than 3000 $\mu$m will be difficult to achieve with powder coating.

In addition to the particular powder mentioned above, many other powders may be used for the photoelastic layer 26, provided they are translucent or transparent and become optically anisotropic when stress and strain is applied. For example, a clear coat that may be used is available from H.B. Fuller Company of Oakdale, Minn. (part number 1F 444 HSFD).

Figure 2:
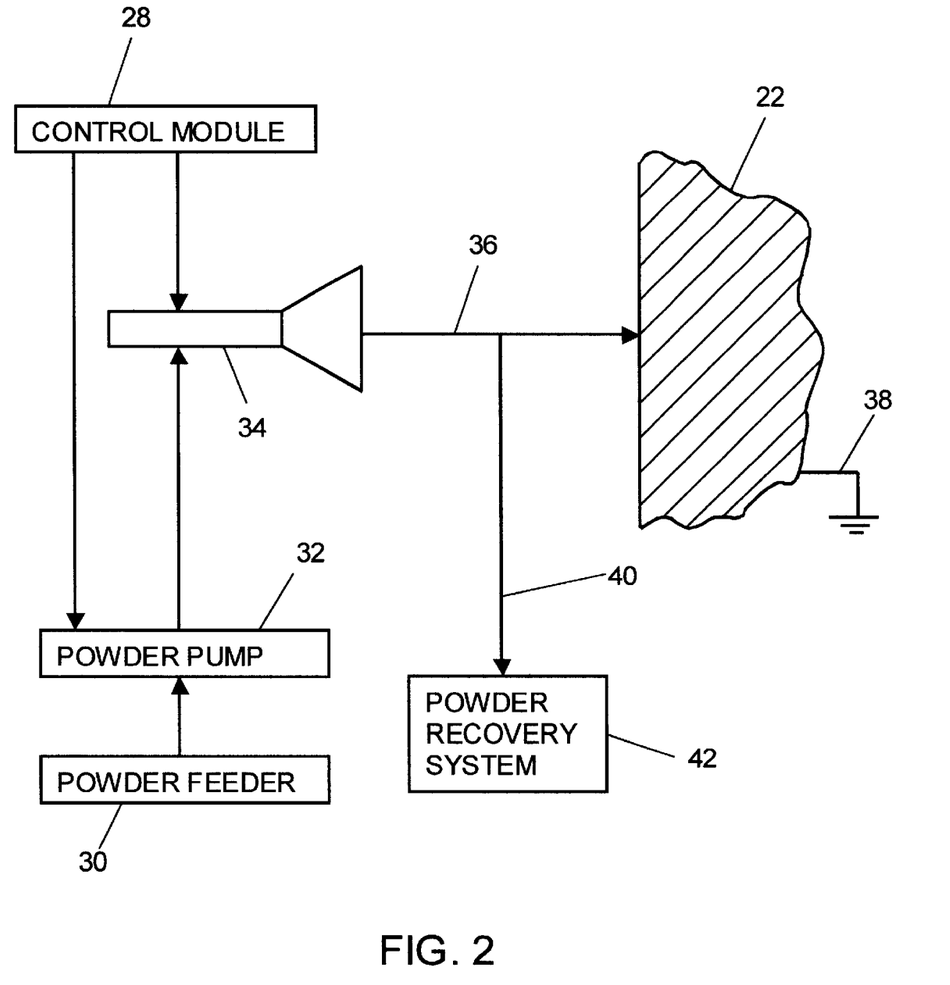
FIG. 2 is a schematic diagram of a typical powder coating process employed for applying the photoelastic layer according to the present invention.

Description of Powder Coating Process—FIG. 2

In a typical powder coating process, powder particles are electrostatically charged and applied to an electrically grounded part. The two layers of powder coat described above (the reflective layer 24 and the photoelastic layer 26)

were applied to the test part 22 with the powder coat system shown schematically in FIG. 2. Before coating, the part 22 was cleaned and dried so it was free of oil and other surface contaminants. The powder is typically kept in a powder feeder 30. The powder was electrostatically charged by an electrostatic control module 28 and pumped to a spray gun 34. The charged powder 36 was then sprayed with compressed air onto the part 22. The part 22 was electrically grounded through a grounding wire 38. Any excess powder 40 that did not adhere to the part was retrieved by a powder recovery system 42. Powder recovery systems typically enable powder coating systems to capture and reuse 99 percent of over-sprayed excess powder 40. Once the part 22 has been coated, it was baked in an oven at a temperature recommended by the manufacturer to fuse the powder and create a smooth finish. Once the first coat had been applied, the second layer was applied in the same manner.

Powder coating is typically applied in a thickness ranging from 40 μm to 150 μm (0.001" to 0.006"). A thickness outside of this range is more difficult to achieve but can be accomplished by someone skilled in the art of powder coating. Aluminum test samples were prepared in which clear powder coat was applied with a thickness of approximately 100 μm (0.004") and 180 μm (0.007") respectively by Rainbow Powder Coating of Coquitlam, BC. Typical techniques for achieving thicker coatings include heating the part 22 prior to coating so the powder melts somewhat upon contact with the part 22, thus helping adhesion. A thicker photoelastic layer 26 gives a greater photoelastic response (more fringe patterns) and may be desirable if the strains anticipated are smaller or if the particular powder being used has a lower photoelastic sensitivity.

Although powder coating as a finishing process does not always require more than one coat, two or more coats may be used to achieve special effects, colors, or extra durability. Also, a clear coat is often applied on top of a base coat. A person skilled in the art of powder coating may powder coat an object with two or more different coats. Once all of the required coats have been cured, the part 22 is ready for photoelastic analysis.

Powder coat finishes may be stripped off and reapplied as many times as necessary. The reflective layer 24 and the photoelastic layer 26 are not necessarily intended to be the final finish on the part 22, although they may be. These layers may be stripped off once the photoelastic analysis is complete, allowing the part to be refinished as desired.

Figure 3:
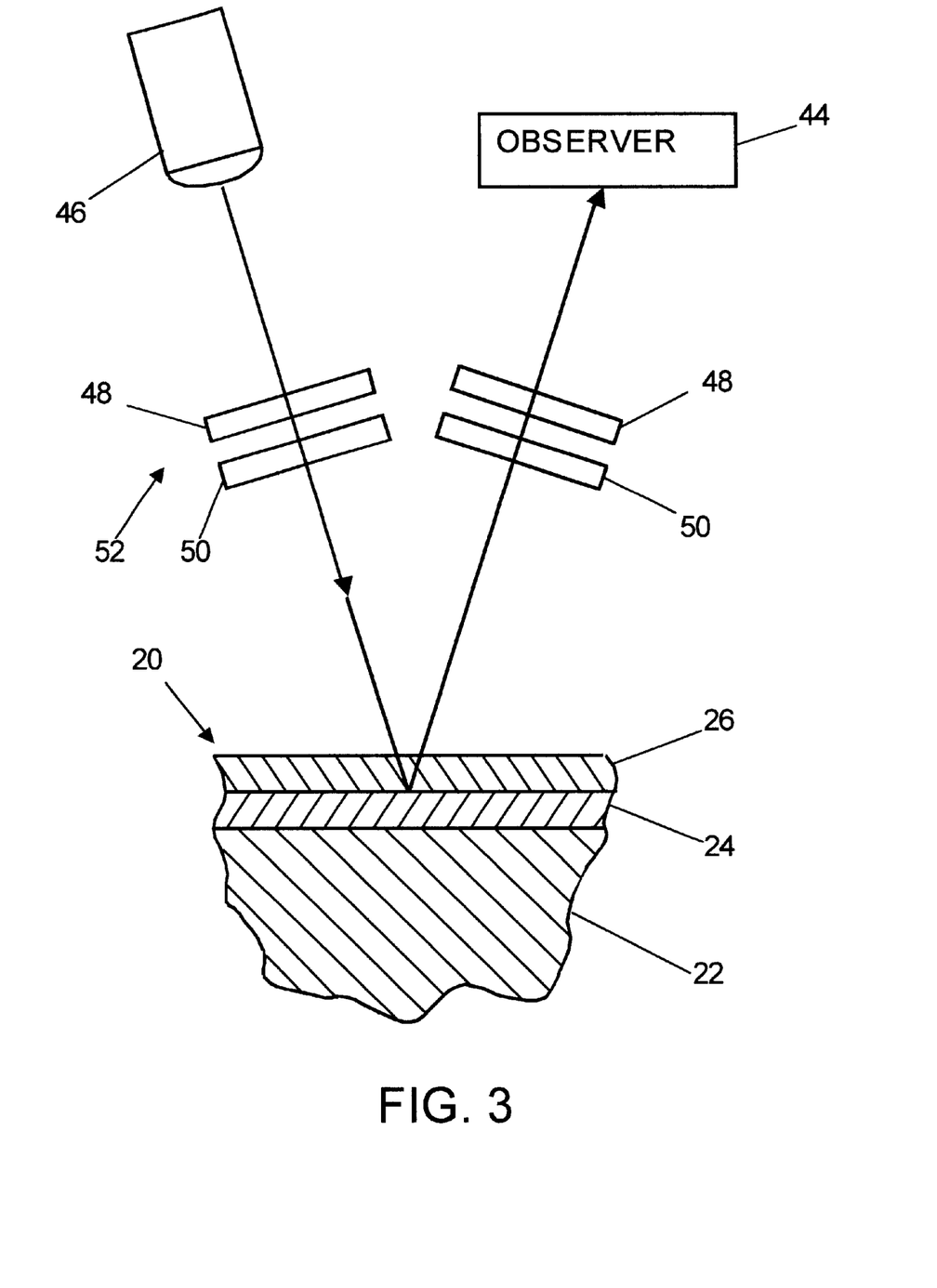
FIG. 3 is a schematic diagram of an experimental setup for detecting stress and strain using photoelastic techniques according to the present invention.

Description of Photoelastic Analysis—FIG. 3

Once the reflective layer 24 and the photoelastic layer 26 have been applied and cured, standard photoelastic techniques can be used to analyze the stresses and strains in the part 22. The stress and strain in the aluminum part 22 was viewed with the experimental set-up shown in FIG. 3. The part 22 was illuminated with a source of polarized light 52. In this experiment, the source of polarized light 52 comprised a light source 46 which produced white light, and a polarizing filter 48. The light from the light source 46 was also passed through a quarter-wave plate 50 to produce circularly polarized light. The circularly polarized light passed through the photoelastic layer 26 and reflected off the reflective layer 24. The reflected light was viewed through another quarter-wave plate 50 and another polarizing filter 48. Observed in this way, fringe patterns became visible in the photoelastic layer 26 corresponding to the amount of strain in the part 22. Greater strain resulted in more fringe patterns.

If the relationship between strain and fringe patterns for the photoelastic layer 26 is known, the strain can be quantified. Using photoelastic techniques and principles, the fringe patterns that occur in the photoelastic layer 26 may be interpreted by a person skilled in the field to determine the direction and magnitude of the strain being experienced by the part 22. Knowledge of the relationship between stress and strain for the particular material being tested typically allows the stresses in the part to be determined from the measured strains.

Two combined polarizing filter and quarter-wave plate sheets from Measurements Group Inc. of Raleigh, N.C. were used for the experiment described above. One was a left-hand circular polarizing sheet and one was a right-hand circular polarizing sheet (part number 100-012000). The quarter-wave plates 50 are not essential for the photoelastic analysis. The polarized light can be circularly-polarized or non-circularly polarized. Another photoelastic technique employs only the polarizing filters 48 to produce non-circularly polarized light and may be used to determine the direction of principal strains. Adding the quarter-wave plates 50 results in circularly-polarized light. When the light is circularly-polarized, the image observed in the photoelastic layer is not influenced by the direction of principal strains. Photoelastic analysis can also be performed by adding a polarizing film on top of the photoelastic layer 26.

In addition to observation and interpretation by a technician, the fringe patterns in the photoelastic layer 26 may be captured using a still or video camera. Specialized apparatus for performing photoelastic measurements as described above is available from Measurements Group Inc. of Raleigh, N.C. For instance, a reflection polariscope can be used to assist in measuring and quantifying the fringe patterns and hence determining the stress and strain in the part. An example of instrumentation that can be used for viewing the photoelastic effect is the 030 Series Modular Polariscope System available from Measurements Group Inc.

If the part is subjected to a force that is insufficient to cause plastic deformation in the part, the fringe patterns in the photoelastic layer 26 will disappear when the force is removed. However, if the applied force results in plastic deformation of the part 22, fringe patterns will continue to be visible in the regions of the part 22 where plastic deformation has occurred. Using powder coating combined with photoelastic techniques can be particularly useful for determining if plastic deformation has occurred in parts subjected to loads in field testing, or in production parts that have been subjected to loads in service. In the embodiment tested, the thinness of the photoelastic layer 26 was such that significant strain was required to produce fringe patterns. However, strain in the plastic range of aluminum alloy produced readily visible fringe patterns. Critical areas in the machined aluminum part 22 were thus easily identified using the method described. Without using powder coating and photoelastic techniques, structural deformation resulting from field testing would have been very difficult to detect. With the information from the photoelastic analysis, the part 22 could be redesigned to reduce the stresses in the areas that experienced plastic deformation.

Figure 4A:
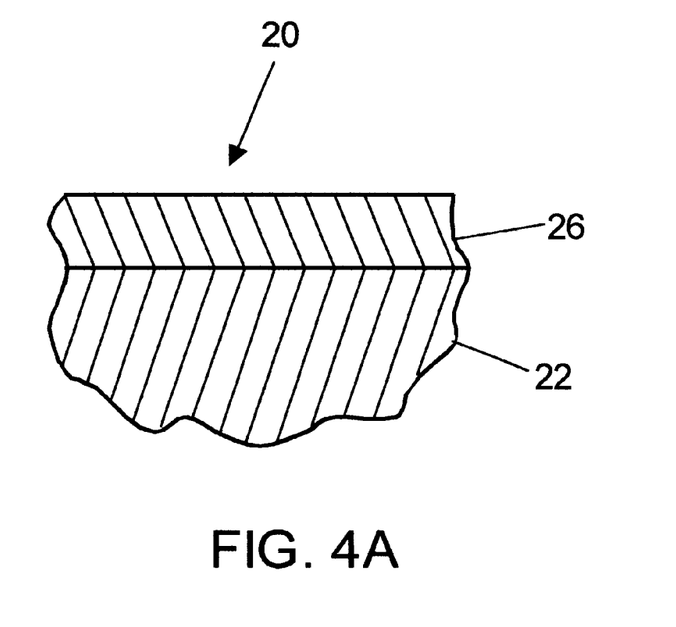
FIG. 4A is a side view of a laminate structure comprising a part and a photoelastic layer applied directly to the part using powder coating techniques.
Figure 4B:
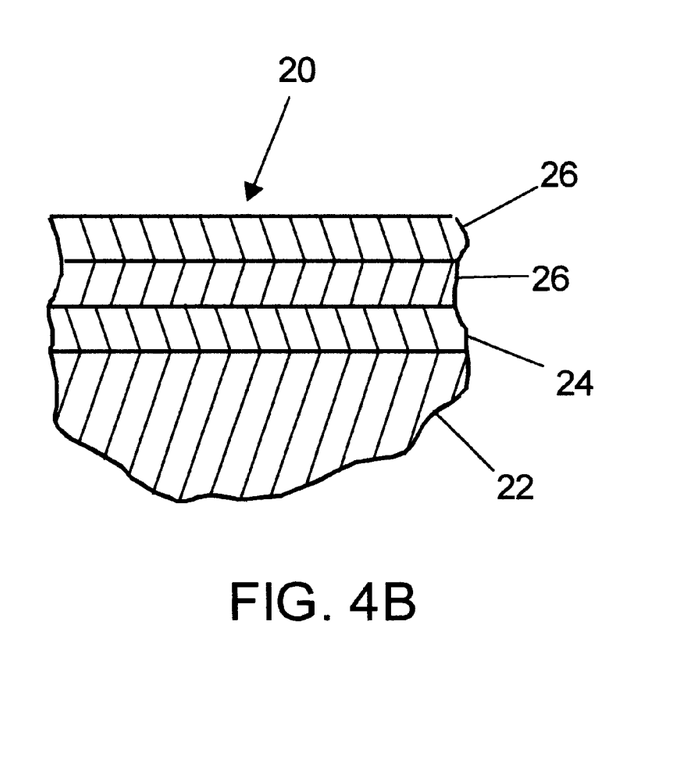
FIG. 4B is a side view of a laminate structure comprising a part, a reflective layer, and multiple photoelastic layers applied using powder coating techniques.

Description of Alternative Embodiments—FIGS. 4A–4B

Additional embodiments are shown in FIG. 4A and FIG. 4B. The preferred embodiment described in the previous section involves powder coating and photoelastic analysis in which a part 22 is coated with a reflective layer 24 and a photoelastic layer 26. FIG. 4A shows a laminate structure 20 which consists of a part 22, a photoelastic layer 26, but no reflective layer. Instead, the surface of the part 22 is shiny and can typically serve the same function as the reflective layer 24.

A test part 22 made out of aluminum alloy was polished and coated with translucent powder coating from Tiger Drylac USA Inc. of Ontario, Calif. (part number 49/21500 "yellow"). The powder coat was applied in a layer approximately 50 μm (0.002") thick. When subjected to a force, fringe patterns were visible indicating areas of stress and strain. However, the fringe patterns were not as clear as the fringe patterns in the test sample which included a reflective layer 24. Hence using a reflective layer 24 is preferable to using the surface of the part as the reflective layer.

FIG. 4B shows a laminate structure 20 which consists of a part 22, a reflective layer 24, and multiple photoelastic layers 26. To achieve a thicker photoelastic layer 26, a single thicker layer of powder can be applied. An alternative to applying the photoelastic layer 26 with one thick layer of powder coat is to apply multiple photoelastic layers as shown. As discussed previously, a thicker photoelastic layer 26 can result in a greater photoelastic signal.

Figure 5:
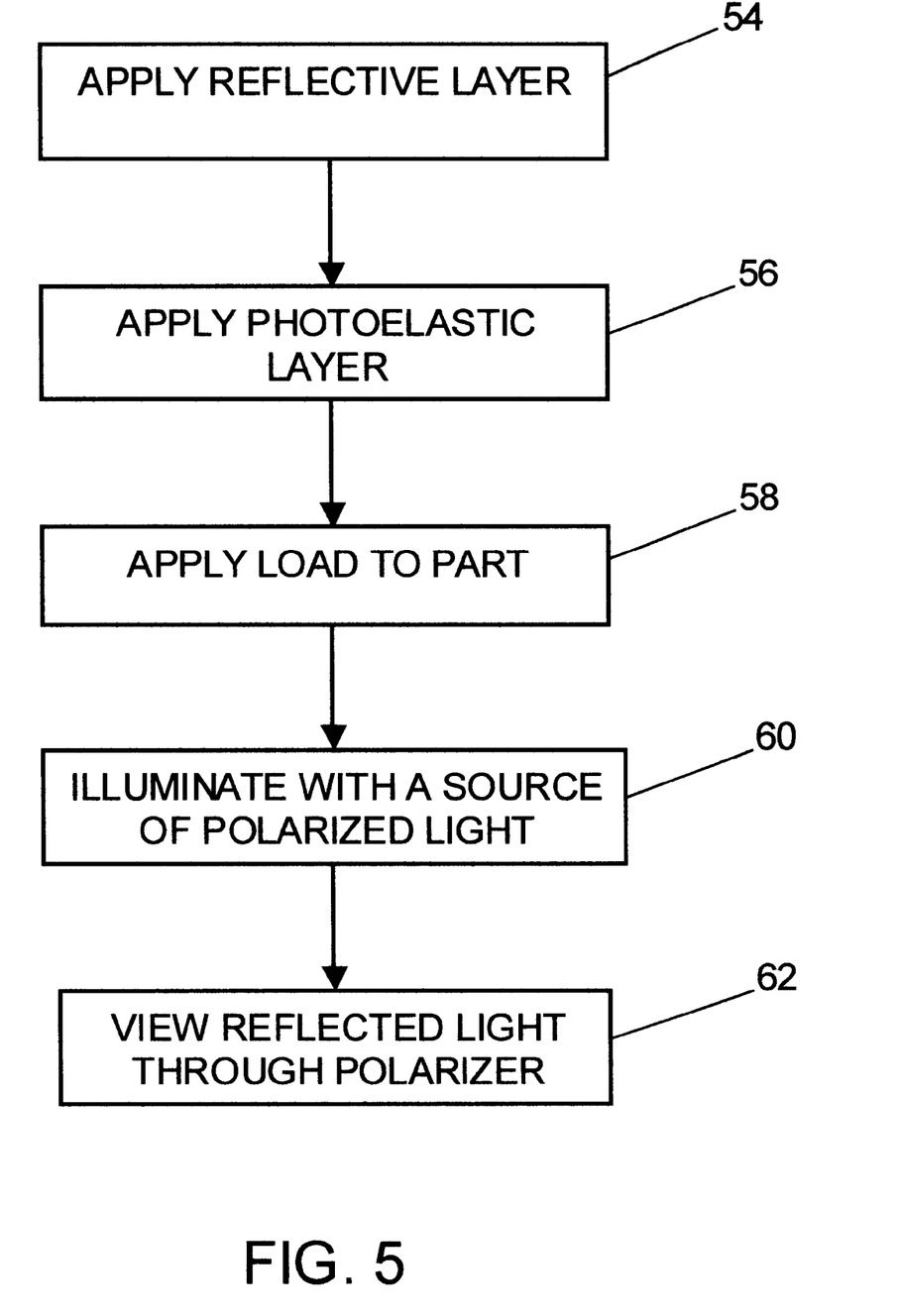
FIG. 5 is a flow chart showing a series of steps for determining stress and strain in a part according to the present invention.

Summary—FIG. 5

In summary, the present invention provides a method whereby stress and strain in a part can be detected. FIG. 5 shows a sequence of steps by which a preferred embodiment of this method may be accomplished. In step 54, a reflective layer 24 is applied to a part. In step 56, a photoelastic layer 26 consisting of non-opaque powder coat exhibiting photoelastic effects is applied over the reflective layer 24. In step 58, a force is applied to the part 22. In step 60, the part is illuminated with a source of polarized light 52. Finally, the reflected light is viewed through a polarizer 62 to detect and quantify the strain in the part 22.

The viewing of stresses and strains in parts with powder coat finishes using photoelastic analysis represents a novel and unexpected use of powder coat and powder coating technology. Such a method can make the detection of stress and strain much easier, especially in parts that have experienced plastic deformation when subjected to real loads. Also, applying a photoelastic coating with powder coating methods can provide great advantages over traditional photoelastic methods.

Advantages

From the description above, specific embodiments using a photoelastic powder coat combined with photoelastic techniques for viewing stress and strain may provide one or more of the following advantages:

1. Powder for powder coating is widely available as is the apparatus required to apply the powder to a part.
2. Powder coating is significantly less expensive than traditional methods of applying photoelastic coatings.
3. The process of powder coating is fast and non-labor intensive compared to traditional methods of applying photoelastic coatings. Applying a powder coat finish for the purposes of photoelastic analysis can be as easy as applying a standard powder coat finish for aesthetic and protective reasons.
4. Because the powder is sprayed on, it can conform to complex part shapes and a wide range of sizes.
5. A powder coat provides a good fit between the coating and the part. The coating is automatically bonded to the part and reflective cement is not required as with traditional photoelastic coatings.
6. Powder coating lends itself to automation. Parts can be easily coated automatically with a robotic painter similar to those presently in use.
7. The coating can be used on production parts as well as test parts. In the past, photoelastic techniques have typically been used during the product development and testing phase. Applying a photoelastic coating using powder coating can additionally be used for production parts because of the low cost of powder coating. Production parts can then be monitored for stress and strain in service without affecting the operation of the part. A photoelastic powder coat finish can also provide a strong, durable, aesthetically pleasing finish for the part.
8. The infrastructure for powder coating already exists and is widely available.

A method of stress and strain detection involving the use of powder coating and photoelastic techniques offers numerous advantages over other methods of stress and strain detection. Powder coating can be applied to many parts in a very consistent, cost-effective manner. As such, the method of stress and strain detection described can potentially be used advantageously for the following purposes:

1. Product design through determination of stress and strain on parts being used in service. Determining stresses and strains on test or production parts in service is often of interest for redesigning a part or designing a new part. Because powder coating is a finish that is often used for parts in service, stresses and strains can be observed and measured on the part in service without affecting its operation through the use of a non-opaque photoelastic powder coat and photoelastic techniques. For example, in the design of a new landing strut for an aircraft, the directions and magnitudes of forces that the strut experiences can be determined by coating an existing strut and measuring the strains in both laboratory testing and in-flight testing. During in-flight testing, a recording device such as a camera could be used with a polarized light source and polarizing filters to detect the stresses and strains that are being experienced by the part.
2. Detecting permanent structural deformation. Detecting structural deformation in parts that have been exposed to test loads or loads in service is typically difficult to do, Often, the part must stripped of its finish and dimensional analysis employed. Dimensional analysis is time consuming and labor intensive. By coating the parts with a non-opaque photoelastic powder coat and using photoelastic techniques, permanent structural deformation can be readily detected. In this case, photoelastic analysis is carried out on the part after the loads have been removed instead of while the loads are being applied. Fringe patterns appear where plastic deformation has occurred, indicating areas of permanent structural deformation. For example, a landing strut coated with a photoelastic powder coat finish can be inspected after use in service or after testing to determine if yield stresses have been exceeded.
3. Verifying Finite Element Analysis. Verifying the results of finite element analysis typically requires significant amounts of strain gauging and data acquisition. Photoelastic techniques using a photoelastic powder coat can provide an easier visual verification of finite element analysis results.

4. Routine inspections and monitoring. Traditionally, photoelastic techniques have only been applied to test parts and not to production parts that are used in service because of the high cost of applying photoelastic coatings and because existing photoelastic coatings are not suitable for use on parts in service. Since a photoelastic powder coat uses standard finishing technologies, it can be much less expensive to apply. Since many production parts already have powder coat finishes applied to them, applying a powder coat finish that is also a photoelastic coating can offer a great increase in functionality with very little increase in cost. Routine inspections using photoelastic techniques can then be carried out easily on production parts for a reasonable cost. For example, production landing struts on aircraft have to be checked regularly to ensure that they continue to be safe. Presently, inspections are typically carried out using expensive crack detection methods such as liquid penetrant dyes, etc. Detecting plastic deformation is very difficult to do but would be very useful for determining whether the part is suitable for continued operation. A method for detecting at plastic deformation using a photoelastic powder coat finish can provide an easier and lower-cost indication of structural problems than expensive crack monitoring. The photoelastic powder coat finish also serves a dual purpose as a attractive, durable, and light weight protective coating for the part during its service life.

5. Maintenance scheduling. Traditionally, maintenance scheduling was determined by inspection. Traditional methods of inspection are costly and slow. If production parts are coated with a photoelastic coating using powder coat, the inspection process becomes greatly simplified. More inspections can then be carried out at a lower cost, which will lead to more timely maintenance. Conversely, inspections can be reduced because the photoelastic powder coating provides a better and earlier indication of damage.

6. Quality control. Using a photoelastic powder coat finish and photoelastic techniques can also help with quality control during manufacturing. For example, parts that normally should be installed with no initial load can be checked for proper fit by observing whether any strain fields appear subsequent to assembly. Conversely, the proper preload can be verified on parts that are intended to fit in an assembly with certain preload. For example, a spring that is designed to be fit with a certain amount of preload in a vibration absorption system can be coated with the photoelastic powder coating to provide a visual indication of the amount of preload being applied. Photoelastic techniques can also be used on production parts coated with a photoelastic powder coat finish to verify that they meet specifications.

7. Tools. The photoelastic powder coating can be integrated into tools that are designed to exert a certain amount of force on a part. For example, a specially designed torque wrench can be coated with the photoelastic powder coating to give a visual indication of the amount of torque being applied.

8. Education and research. Products demonstrating stress/strain can be built and used for educational and research purposes. The photoelastic powder coating allows for research into stress fields in complex shapes at a lower cost than traditional methods.

Many modifications, substitutions, and improvements will be apparent to the skilled artisan without departing from the spirit and scope of the present invention as described herein and defined in the claims.

Conclusion, Ramifications, and Scope

In conclusion, we have invented a method of detecting stress and strain using a powder coat finish and photoelastic analysis that offers numerous advantages over traditional methods of detecting stress and strain. Powder for powder coating is widely available as is the apparatus to apply it to a part. The application of the powder coat is faster and less costly than traditional methods of applying photoelastic coatings which are slow and labor intensive. A powder coat finish can conform to complex shapes easily and consistently. Furthermore, the application of powder coat can easily be automated. The lower cost and speed of applying a photoelastic coating through the use of powder coat means that photoelastic coatings can be applied to production parts in addition to parts for testing. In addition to its photoelastic properties, powder coat provides an aesthetically pleasing and durable protective finish. On production parts, the photoelastic coating can offer many advantages, including but not limited to inspection, maintenance scheduling, warranty claim validation, quality control, and monitoring.

Although our above description contains many specificities, these should not be construed as limiting the scope of the invention but as merely providing illustrations of some of the presently preferred embodiments of this invention. The preferred embodiment describes an application in which the photoelastic effect is used to measure strain with the purpose of detecting stress. In addition, the fringe patterns produced could be used for calibration, inspection, maintenance, visualization, and educational purposes. Accordingly, the scope of the invention should be determined by the appended claims and their legal equivalents, rather than by the examples given.

We claim:

1. A method for detecting stress and strain, the method comprising:
   a. providing a part coated with a photoelastic layer comprising non-opaque powder coat that becomes optically anisotropic when subjected to stress and strain;
   b. detecting stress and strain in said part using the photoelastic properties of said photoelastic layer.

2. The method according to claim 1, wherein the step of providing a part coated with a photoelastic layer comprises applying a dry, finely divided solid to said part and curing the solid powder to form a continuous film which adheres to said part to form said photoelastic layer.

3. The method according to claim 2, wherein the step of applying a dry, finely divided solid comprises electrostatically applying the solid.

4. The method according to claim 1, wherein the step of providing a part coated with a photoelastic layer comprises providing a reflective layer and applying said photoelastic layer on top of said reflective layer.

5. The method according to claim 4, wherein the step of providing a reflective layer comprises applying a dry, finely divided solid to said part and curing the solid powder to form a continuous film which adheres to said part to form said reflective layer.

6. The method according to claim 1, wherein the step of providing a part coated with a photoelastic layer comprises applying said photoelastic layer directly to said part.

7. The method according to claim 1, wherein the step of providing a part coated with a photoelastic layer comprises sequentially applying a plurality of coats to form said photoelastic layer.

8. The method according to claim 1, wherein the powder coat comprises a polyester material.

9. The method according to claim 1, wherein the powder coat comprises the chemical triglycidyl isocyanurate.

10. The method according to claim 1, wherein said photoelastic layer is between 5 $\mu$m and 3000 $\mu$m thick.

11. The method according to claim 1, further comprising the step of observing fringe patterns in said photoelastic layer to quantify the stress and strain in said part.

12. The method according to claim 1, wherein the step of detecting stress and strain comprises:
   a. illuminating said part with polarized light;
   b. viewing the light reflected from said part through a polarizing filter to determine if fringe patterns are visible in said photoelastic layer.

13. The method according to claim 12, wherein said part is illuminated with circularly polarized light.

14. The method according to claim 12, wherein the step of viewing the reflected light comprises viewing the reflected light through a quarter-wave plate.

15. The method according to claim 12, wherein the step of viewing the reflected light comprises recording the reflected light with a camera.

16. A method for performing photoelastic analysis on a part comprising applying a photoelastic layer as a dry, finely divided solid and curing the solid powder to form a continuous film which adheres to said part, whereby stress and strain in said part can be detected.

17. The method according to claim 16 wherein said photoelastic layer comprises a non-opaque plastic which becomes optically anisotropic when stressed.

18. The method according to claim 16, comprising applying a reflective layer to the part prior to applying said photoelastic layer.

19. The method according to claim 18, wherein the step of applying said reflective layer comprises applying a dry, finely divided solid and curing the solid powder to form a continuous film which adheres to said part.

20. The method according to claim 16, wherein the step of applying said photoelastic layer comprises applying a plurality of coats to form said photoelastic layer.

21. The method according to claim 16, wherein the solid is a polyester powder coat.

22. The method according to claim 16, wherein the solid powder comprises the chemical triglycidyl isocyanurate.

23. The method according to claim 16, comprising applying said photoelastic layer such that said photoelastic layer has a thickness between 5 $\mu$m and 3000 $\mu$m.

24. A method for detecting plastic deformation, the method comprising:
   a. providing a part coated with a photoelastic layer of non-opaque powder coat that becomes optically anisotropic when subjected to stress and strain;
   b. applying a load to said part;
   c. illuminating said part with a source of polarized light;
   d. viewing the light reflected from said part through a polarizer after removal of said load;
whereby the presence of fringe patterns in said photoelastic layer indicates that plastic deformation of said part has occurred.

25. The method according to claim 24, comprising applying a reflective layer to said part prior to applying said photoelastic layer.

26. The method according to claim 25, wherein the step of applying said reflective layer comprises applying a dry, finely divided solid and curing the solid powder to form a continuous film which adheres to said part.

27. The method according to claim 24, wherein the step of providing a part coated with a photoelastic layer comprises sequentially applying a plurality of coats to form said photoelastic layer.

28. The method according to claim 24, wherein the powder is a polyester powder.

29. The method according to claim 24, wherein the powder comprises the chemical triglycidyl isocyanurate.

30. The method according to claim 24, wherein the photoelastic layer is between 5 $\mu$m and 3000 $\mu$m thick.

* * * * *